(12) United States Patent
Wagstaff et al.

(10) Patent No.: US 9,335,144 B2
(45) Date of Patent: May 10, 2016

(54) HOLE DEPTH MEASUREMENT DEVICE

(71) Applicant: AIRBUS OPERATIONS LIMITED, Bristol (GB)

(72) Inventors: Lee Wagstaff, High Peaks (GB); Philip Lee Bradbury, Bramhall (GB); Gareth Towlson, Tarporley (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 442 days.

(21) Appl. No.: 13/706,799

(22) Filed: Dec. 6, 2012

(65) Prior Publication Data
US 2013/0152398 A1    Jun. 20, 2013

(30) Foreign Application Priority Data

Dec. 19, 2011 (GB) .................................... 1121836.9

(51) Int. Cl.
| | |
|---|---|
| *G01B 5/02* | (2006.01) |
| *G01B 1/00* | (2006.01) |
| *G01B 3/28* | (2006.01) |
| *B21D 53/92* | (2006.01) |
| *G01B 5/18* | (2006.01) |

(52) U.S. Cl.
CPC *G01B 5/02* (2013.01); *B21D 53/92* (2013.01); *G01B 1/00* (2013.01); *G01B 3/28* (2013.01); *G01B 5/18* (2013.01); *Y10T 29/49622* (2015.01)

(58) Field of Classification Search
CPC .............. G01B 5/02; G01B 5/18; G01B 1/00; G01B 3/28; B21D 53/92; Y10T 29/49622
USPC ................ 33/494, 531, 542.1, 832, 833, 836; 29/897.2; 264/334
See application file for complete search history.

(56) References Cited

U.S. PATENT DOCUMENTS

| | | | | |
|---|---|---|---|---|
| 1,776,245 | A | * | 9/1930 | Barrett ............................. 33/494 |
| 2,378,544 | A | * | 6/1945 | Fosse et al. ...................... 66/117 |
| 4,033,043 | A | * | 7/1977 | Cunningham .................. 33/806 |

(Continued)

FOREIGN PATENT DOCUMENTS

| | | |
|---|---|---|
| GB | 1436521 A | 5/1976 |
| GB | 2276454 A | 9/1994 |

OTHER PUBLICATIONS

Search Report corresponding to GB 1121836.9, dated Apr. 19, 2012.

(Continued)

*Primary Examiner* — R. A. Smith
*Assistant Examiner* — Tania Courson
(74) *Attorney, Agent, or Firm* — Hauptman Ham, LLP

(57) ABSTRACT

A plastic hand-held measuring device, can measure the depth of a hole or bore or the length of a fixing, having particular application with composite aircraft components. A hook or tang, at the end of an elongate portion, can engage with the far end of the bore allowing the depth ascertained from a first measurement scale. A first formation can engage with a fixing, allowing measurement of the length of the fixing from a second measurement scale. A plastic slide can abut against a portion of the component to be measured and indicate the distance on the measurement scale that corresponds to the length of the dimension being measured. The slide may be arranged to engage with successive indexed formations along the length of the device, so that it is inclined to remain in a position corresponding to an indexed formation.

22 Claims, 12 Drawing Sheets

(56) References Cited

U.S. PATENT DOCUMENTS

| | | | |
|---|---|---|---|
| 4,216,585 A | | 8/1980 | Hatter |
| 5,013,318 A | * | 5/1991 | Spranza, III .................. 606/102 |
| 5,390,427 A | | 2/1995 | Heller et al. |
| 5,497,560 A | | 3/1996 | Pasquerella et al. |
| 6,253,771 B1 | * | 7/2001 | McClaine .................... 132/200 |
| 6,729,037 B2 | * | 5/2004 | White ............................ 33/755 |
| 7,070,375 B2 | * | 7/2006 | Hoeckelman .................. 411/54 |
| 7,165,336 B2 | * | 1/2007 | Kim ............................... 33/512 |
| 7,607,238 B2 | * | 10/2009 | Kim et al. ...................... 33/512 |
| 2004/0055168 A1 | | 3/2004 | Allen |
| 2006/0083599 A1 | * | 4/2006 | Hoeckelman .................. 411/54 |
| 2008/0067719 A1 | | 3/2008 | Schlummer et al. |
| 2008/0104855 A1 | | 5/2008 | Kim et al. |

OTHER PUBLICATIONS

Search Report corresponding to EP12195243.6-1558, dated Apr. 4, 2013.

"Hi-Lok" Installation Tools Catalogue; Omega Technologies, Inc.; Westlake Village, California; (2011).

"HUCK" dip gauge photograph, date known—available at least as early as 2011.

* cited by examiner

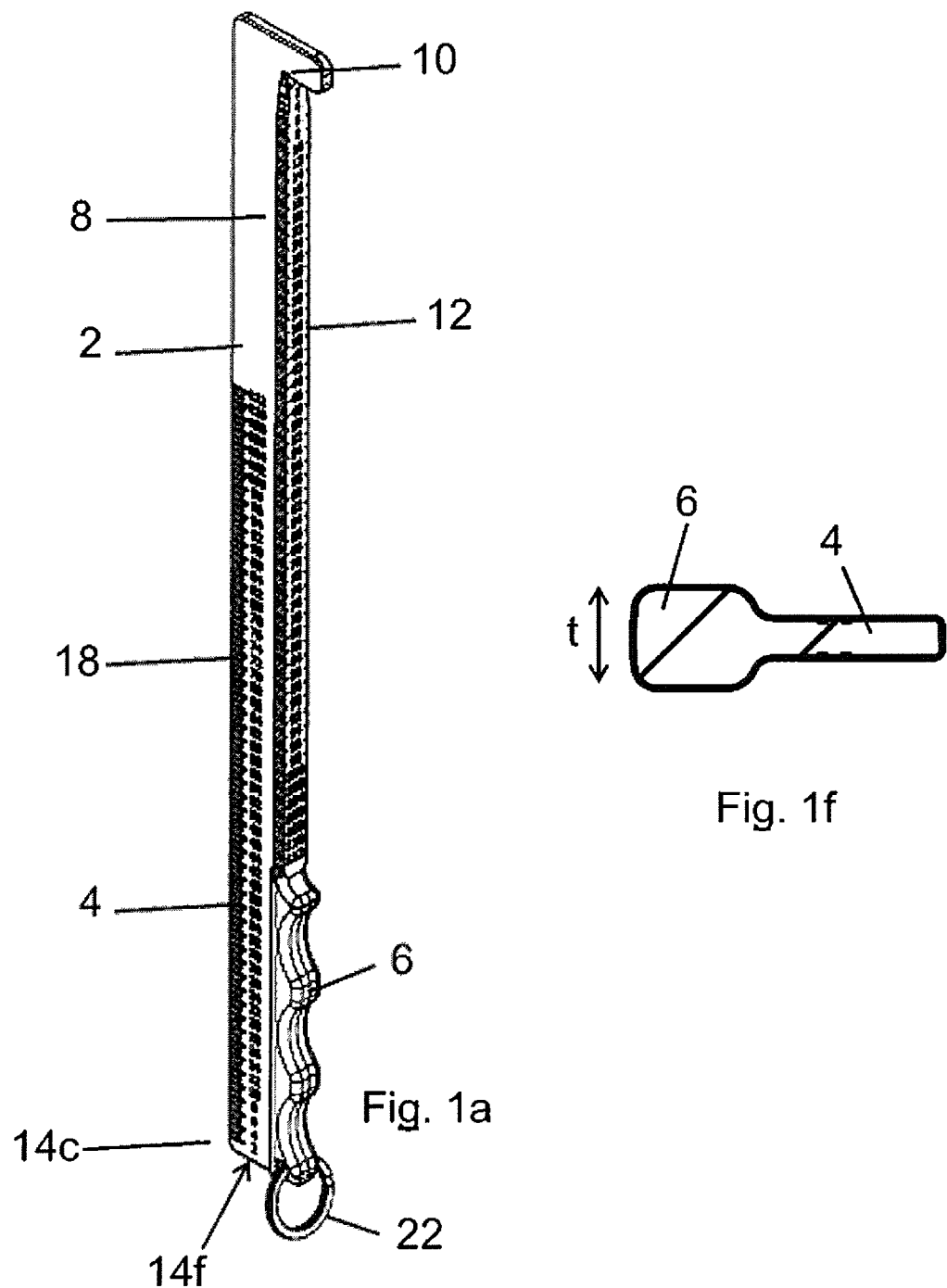

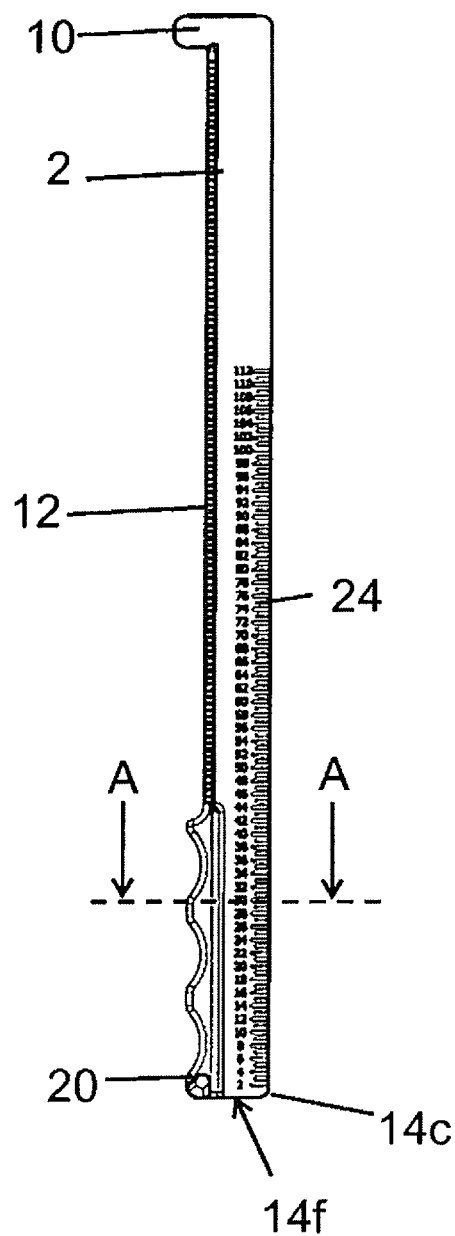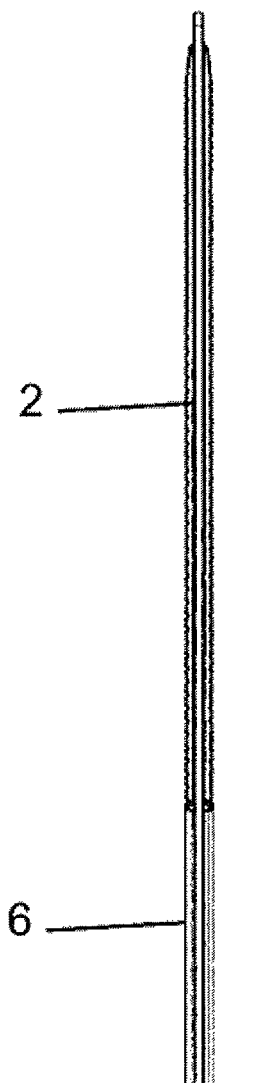
Fig. 1b
Fig. 1c

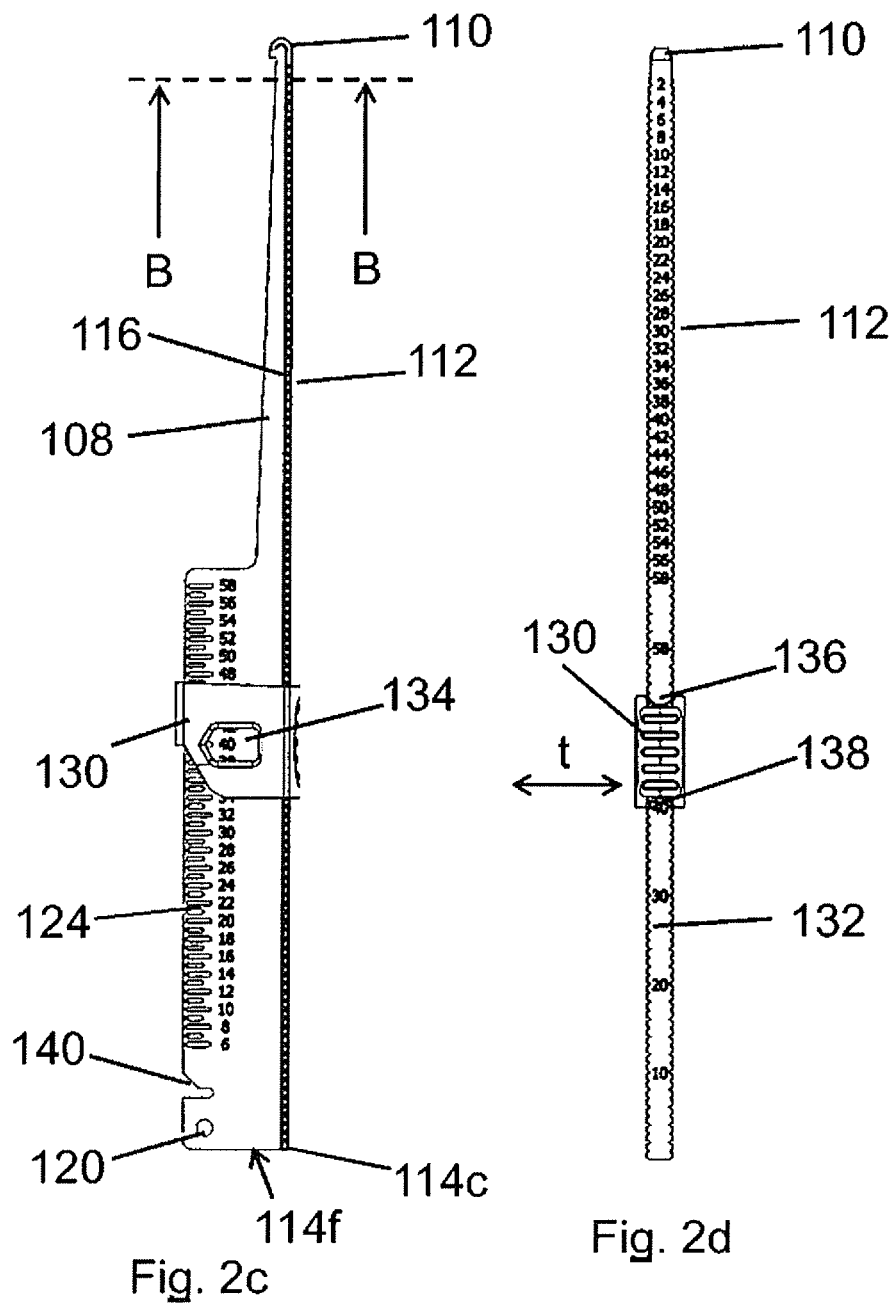

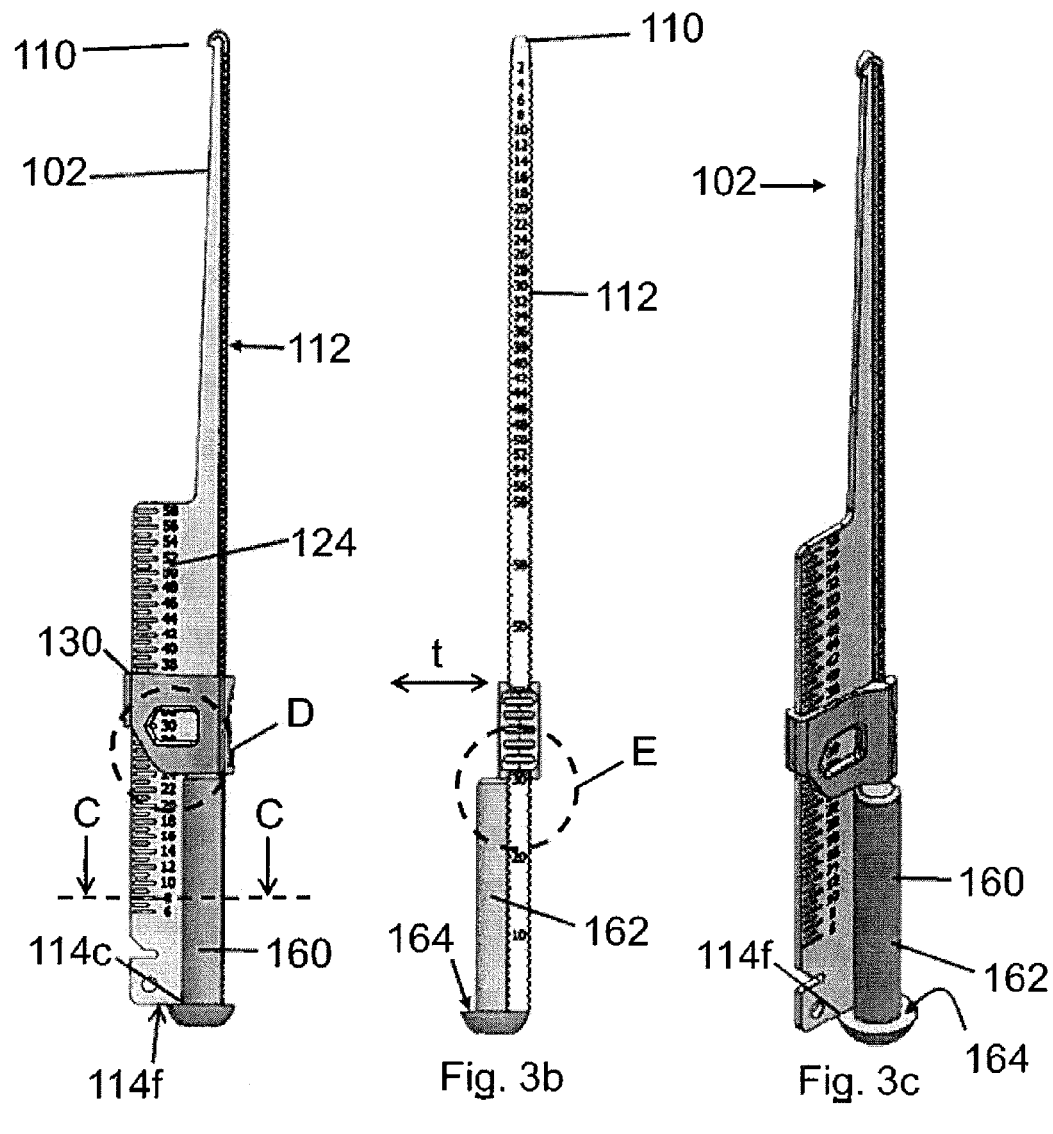

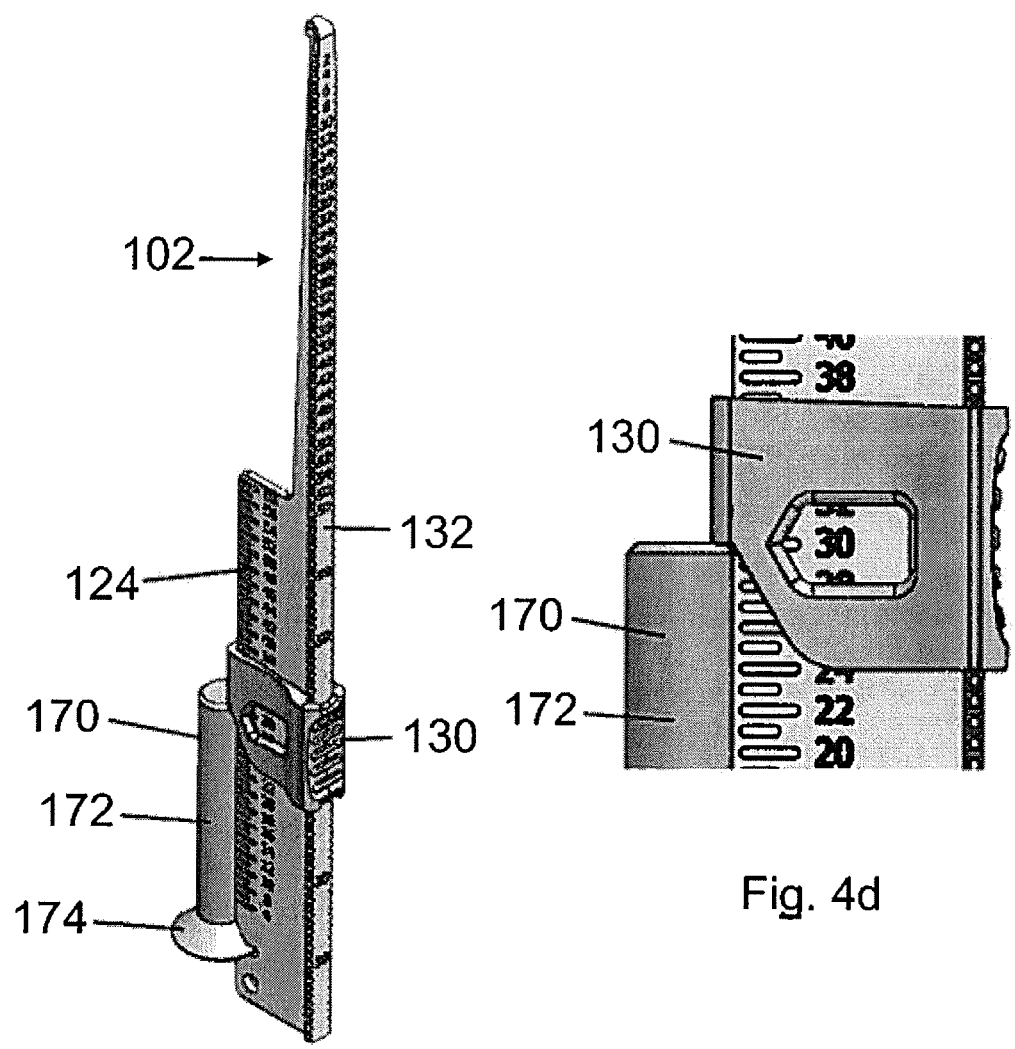

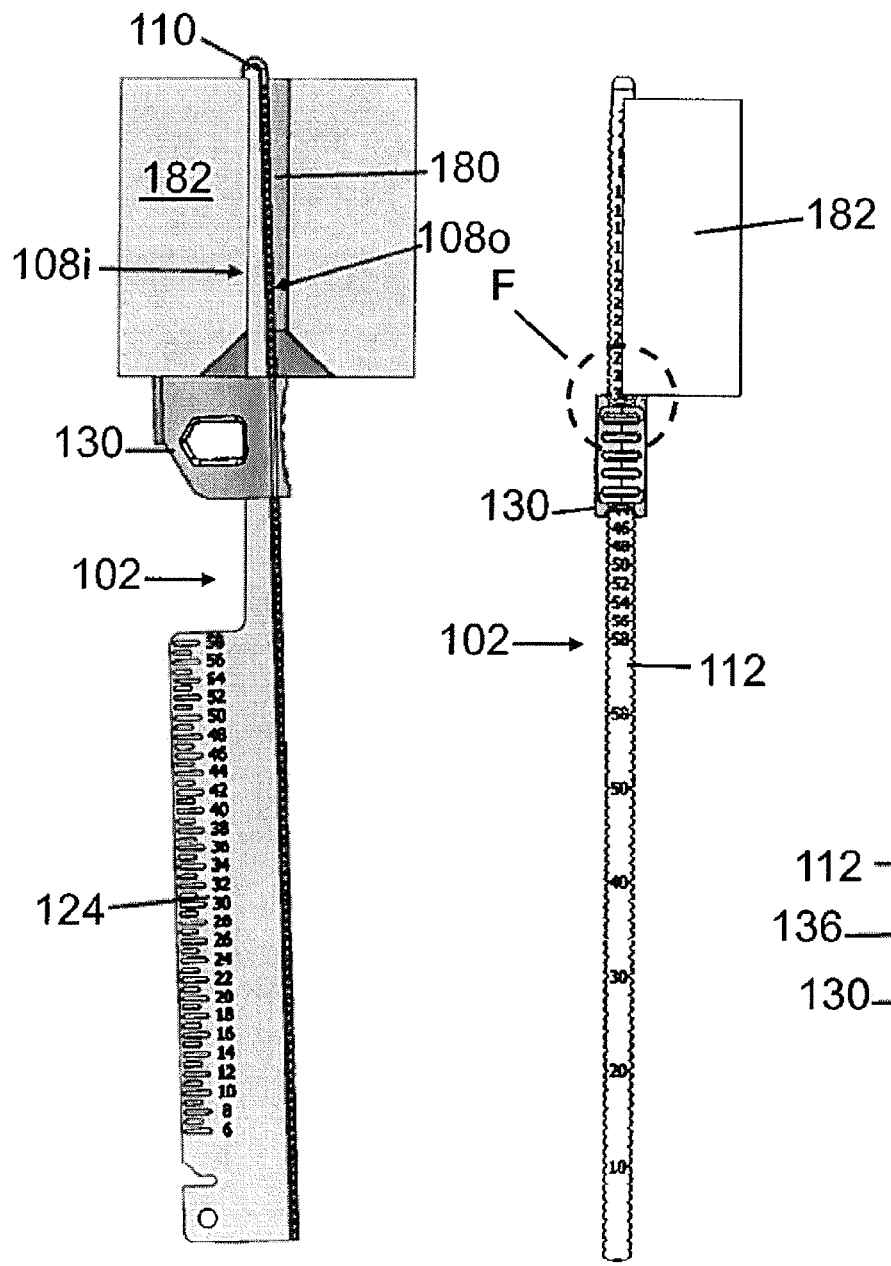

HOLE DEPTH MEASUREMENT DEVICE

RELATED APPLICATIONS

The present application is based on, and claims priority from, British Application Number 1121836.9, filed Dec. 19, 2011, the disclosure of which is hereby incorporated by reference herein in its entirety.

BACKGROUND OF THE INVENTION

The present invention concerns a measuring device for measuring both the depth of a hole and the length of a fixing for such a hole. More particularly, but not exclusively, this invention concerns a device for measuring both the depth of a hole in a composite material aircraft component and for measuring the length of a fixing for insertion into such a hole.

When fixing elements together with a bolt or other fixing that passes through a bore through the elements, particularly when the elements are made of differing materials, it is common to provide a sleeve, for example in the form of a bushing or a bearing arrangement, to line the bore within one or more of the elements. One method of securing the sleeve within the bore is to insert the sleeve in the bore and then cold expand the sleeve within the bore. Such a technique is utilised in the GromEx™ system provided by "FTI" (Fatigue Technology, Inc of Seattle, USA). Briefly, a sleeve received in a bore in a part is expanded by means of a hydraulic puller unit (for example the "Big Brute" Puller—Part No. 2720-008, also from FTI), which exerts a pulling force that pulls a mandrel through the sleeve, whilst the puller unit reacts at least some of the pulling force by means of a nose cap of the unit that butts against the surface of the part that defines the bore. A bolt may then be accommodated within the sleeve to fix the part to another element or part. In some cases, the bolt may form a friction fit or an interference fit with the sleeve.

It is important when installing such a GromEx™ sleeve, for the correct length of sleeve to be installed in the hole. Thus, it is necessary to measure the depth of the hole and then find a sleeve of the correct length for use with the hole. The depth of the hole and the length of the sleeve for insertion in the hole should ideally be manually checked immediately before the sleeve is installed in the hole. If an incorrectly sized sleeve is fitted, the structural integrity of the structure immediately surrounding the sleeve and/or of the sleeve and/or of the bolt in the sleeve may be prejudiced. The bolt to be inserted in the sleeve may also need to be chosen and/or checked so as to of a correct length.

There is therefore a need for one or more tools for measuring such dimensions: one or more of the hole depth, the sleeve length, and the bolt length. The engineers who work on aircraft components are prone to losing such tools. Tools used to measure lengths or depths in the aircraft industry are typically made of metal so as to be rigid, and therefore maintain their accuracy (not flex or bend in use so as to deform to a non-linear shape when supposed to be measuring a linear distance), and hard-wearing to withstand the harsh assembly-line/manufacturing/maintenance environment in which they are typically used.

The present invention seeks to mitigate the above-mentioned problem(s). Alternatively or additionally, the present invention seeks to provide an improved means for measuring hole depth and/or the length of a fixing for use in such a hole.

SUMMARY OF THE INVENTION

The present invention provides, according to a first aspect, a hand-held measuring device for measuring both the depth of a hole (for example a cylindrical bore) and the length of a fixing for such a hole, wherein the measuring device is so arranged that it comprises (i) an elongate portion terminating with a hook, the hook being arranged for engaging with a far end of a hole whilst the elongate portion is located within the hole, (ii) a first measurement scale from which the depth of the hole may be determined when the hook is engaged with the far end of the hole, (iii) a first formation arranged to engage with a corresponding formation on a fixing for such a hole, and (iv) a second measurement scale from which the length of a fixing may be determined when the first formation is engaged with the fixing, and wherein the measuring device is made from plastic.

Thus, one measuring device may advantageously perform both the measuring of hole depth and also the measuring of the length of a fastener for the hole, which fastener may be in the form of a sleeve, insert, bolt or the like. Making the measuring device from plastic has many benefits at least some of which are surprisingly advantageous and of particular application in the aerospace industry. Firstly, the alternative of making the measuring device from metal would render the device unusable with composite aircraft components, where the risk of damage to the composite structure of the aircraft component from contact with a sharp metal surface would be unacceptable. Plastic is therefore an advantageous choice despite the prospect of a plastic measuring device being less hard-wearing and possibly more flexible. It is believed however that the flexibility of a plastic measuring device will not, for the average dimensions that require measurement, introduce any significant errors in measurement. Also, if a metal device were accidentally left inside a fuel tank in a composite wing, there might be an increased risk of electrical discharge from static electricity or induced electricity in the fuel tank or from lightning strike and interaction of such a metal device. Furthermore, another surprising and unexpected advantage is that the making of such a device in plastic allows the colour of the device to be bright, fluorescent, luminescent, or otherwise more noticeable than might otherwise be the case, thus reducing the chances of the device being accidentally lost or mislaid. Yet another surprising and unexpected advantage is that the making of such a device in plastic allows for the use of a slide that resiliently engages with indexed formations that facilitate a reliable and safe way of measuring a dimension without need to take (view) a reading from the device when in situ.

The measuring device is preferably so sized and arranged that it may be held with one hand. The measuring device may comprise a main body by means of which the device may be held with one hand. The elongate portion may extend from the main body.

The device is preferably made from a high-visibility plastic, for example being brightly coloured. Alternatively, or additionally, the device is made from a luminescent plastic. For example, the device may glow in the dark, either with or without external stimulation (for example UV light). As mentioned above, such visible properties of the device may reduce the chances of the device being accidentally lost or mislaid, and/or may assist in finding such a device if lost or mislaid.

The device may have three measurement scales, or more. Of these, one may be located on one side of the device (for example across the width of the device), with another being located on the opposite side of the device. At least one of the measurement scales may be located on a narrow side of the device (for example across the thickness of the device), for example between the two aforesaid sides. The scales on the device are preferably so arranged that the device is ambidextrous.

The first measurement scale may be arranged such that in use when the hook engages the end of a cylindrical bore, a surface of the device opposite the first measurement scale is arranged to abut the interior of the cylindrical bore. Such an opposite surface may be non-parallel to the surface on which the first measurement scale is located. Thus the device may be arranged such that in use when the hook engages the end of a cylindrical bore, the surface on which the first measurement scale is located is non-parallel to the axis of the cylindrical bore. In such a case, especially if the angle of inclination between the surface on which the first measurement scale is located and the opposite surface is significant, the measurement scale may advantageously be scaled accordingly. For example the straight line distance between two indications on the first measurement scale may be greater than the arithmetical difference between the distances indicated by those two indications.

The fixing may be in the form of a bolt, sleeve or the like. The first formation may be arranged to abut against a flat-headed fixing. The first formation may in such a case simply be in the form of a flat edge or surface, for example at an extreme end of the device. Alternatively, the first formation may be arranged to abut against a counter-sunk fixing. The first formation may be arranged to abut against either a flat-headed fixing or a counter-sunk fixing, at the choice of the user. Preferably, however, the first formation is arranged to abut against one only of a flat-headed fixing and a counter-sunk fixing. In such a case, the device preferably has a second formation also arranged to engage with a corresponding formation on a fixing, the device having at least one measurement scale from which the length of a fixing may be determined when the second formation is engaged with the fixing. The first formation may be located at the opposite end of the device to the hook. The second measurement scale may extend from its origin in a first direction substantially parallel to the longitudinal axis of the device. The first measurement scale may extend from its origin in a second direction substantially parallel to the longitudinal axis of the device. The second direction may be opposite to the first direction. For example, the first measurement scale may extend from its origin away from the hook and the second measurement scale may extend from its origin towards the hook. The first and second measurement scales may indicate length in the same units of measurement. Both measurement scales may be in metric units. Both measurement scales may be in imperial units.

The origin of the first measurement scale may be displaced from the hook in a direction parallel to the longitudinal axis of the device. The origin of the second measurement scale may be displaced from the first formation in a direction parallel to the longitudinal axis of the device. The origin of one measurement scale may be displaced relative to the origin of another measurement scale in a direction substantially parallel to the longitudinal axis of the device. For example, the origin of the first measurement scale may be displaced relative to the origin of the second measurement scale in a direction parallel to the longitudinal axis of the device. The second measurement scale, for example the origin of the scale, may be displaced relative to the origin of the measurement scale from which the length of a fixing may be determined when the second formation is engaged with the fixing, the displacement being in a direction substantially parallel to the longitudinal axis of the device.

The device may be of single-piece construction. The device may include a ring, or a means for attaching a ring, and/or a lanyard attached to a ring or other attachment means on or formed by the device and still be considered as being essentially of single-piece construction. Having a device with as few separate parts as possible reduces the risk of the device, or a part thereof, being lost or mislaid during use.

The device may be essentially of two-piece construction including (i) a first piece, which defines the elongate portion, hook, and the first formation and (ii) a second piece. The second piece may be arranged to be moveable relative to the first piece. The second piece may be arranged for sliding motion along the device. The second piece may be provided to assist in taking or reading measurements with the device. For example, the second piece may indicate a measured length when one portion of the device (not being the second piece) engages with one end of the thing to be measured and the second piece engages with the opposite end of the thing to be measured. The second piece is preferably plastic. The second piece may be arranged to move along the length of at least a part of the device and abut a portion of the component to be measured, such that the second piece indicates directly or indirectly the distance on the scale that corresponds to the length of the dimension being measured. The second piece may be in the form of a slide that is able to move along the elongate portion. In the case where the device has a main body portion, such a slide may also be able to move along the main body portion. The device preferably includes a flanged portion for facilitating sliding movement of the slide portion. The second piece (e.g. plastic slide) may have a height (along the length of the device) of less than 50 mm, preferably less than 30 mm. The second piece (e.g. plastic slide) may have a height of greater than 10 mm. The second piece is preferably held on the device such that it cannot be accidentally removed. There may for example be one or more stops that prevent it from sliding beyond one or both ends of the device.

The device may include a series of indexed formations along the length of the device. The second piece (e.g. plastic slide) may be arranged to engage with such indexed formations as it moves (e.g. slides) along the length of the device. In such a case, the device is preferably so arranged that the force required to move the second piece (e.g. plastic slide) from a position in which it is engaging one of the indexed formations is less than the force required to move the second piece from a stationary position midway between two such indexed formations. The indexed formations are conveniently identically shaped, but need not be. The indexed formations are conveniently evenly spaced, but need not be. There may be more than ten indexed formations along the length of the device. The indexed formations are preferably associated with a measurement scale of the device. The gap between adjacent indexed formations is advantageously chosen to be less than or about equal to the desired resolution of accuracy required of the measuring device. The gap between adjacent indexed formations may be between about 0.5 mm and 2 mm.

The second piece (e.g. plastic slide) may be arranged to have at least three different measuring modes. One of the three modes may be a mode for measuring the depth of a hole when the first measurement scale is used. One of the three modes may be a mode for measuring the length of a counter-sunk fixing. One of the three modes may be a mode for measuring the length of a flat-headed fixing. A different part of the second piece (e.g. plastic slide) may be arranged to abut the component being measured as compared between at least two, and preferably three, of the (at least) three measuring modes. The device may be so arranged that in one mode the fixing or component to be measured is to be positioned on one side of the device, whereas in another of the (at least) three modes the fixing or component to be measured is to be positioned on an opposite side of the device. Similarly, a different part of the second piece (e.g. plastic slide) may be arranged to indicate the distance being measured as compared between at least two, and preferably three, of the (at least) three measuring modes. The device may be configured to be used to measure distances both with and without the assistance of the second piece (e.g. plastic slide). The second piece (e.g. plastic slide) may define a window via which a distance being measured is indicated. The second piece (e.g. plastic slide) may define an upper indicating surface, for example an indentation, via which a distance being measured is indicated. The second piece (e.g. plastic slide) may define a lower indicating surface, for example an indentation, via which a distance being measured is indicated. The second piece (e.g. plastic slide) may include a pointer via which a distance being measured is indicated.

The device may have a length of over 100 mm, preferably over 150 mm. The device may have a length of less than 500 mm, preferably less than 350 mm. The length of the device will typically be its maximum dimension. The thickness of the device is preferably between 2 mm and 10 mm. The maximum thickness of the device may be less than 8 mm. As mentioned above, the device may comprise a main body portion from which the elongate portion extends. The maximum width of the device, typically in the region of the main body, is preferably between 10 mm and 30 mm. The elongate portion preferably has a width of less than 10 mm. It will be appreciated that there may be no clearly discernable boundary between the elongate portion and the main body. For example, the elongate portion and the main body may have comparable widths and thicknesses so that there is no readily discernable transition between the main body and the elongate portion. Preferably, however, there is a readily discernable step in width at the junction between the main body and the elongate portion.

Each measurement scale on the device may be defined by the shape of the device. The measurement scale may additionally or alternatively be visually identifiable by means of being coloured differently from the surrounding portion of the device. If the scale is visually recognisable be means of it being shown in relief only, there may be no need during manufacture of the device additionally to paint or etch onto the device such a measurement scale.

The present invention also provides, according to a second aspect of the invention, a method of manufacturing a hand-held measuring device according to the invention as described or claimed herein. Any suitable method could be employed. For example, the device could be manufactured by means of a 3-D printing method. However, the method of manufacturing the measuring device preferably includes a step of providing a mould defining the shape of the device to be made. The method may include a step of moulding plastic material in the mould and allowing the plastic material to set in the mould (for example by curing the plastic material). The method may include a step of removing the measuring device so formed from the mould. The step of moulding plastic material in the mould may include introducing plastic-making material in particulate form and an additive. The method of making the device may include a masterbatch process. The additive may conveniently be in the form of particulate matter, for example granules. The additive preferably introduces high visibility optical properties into the plastic to be moulded. The additive may introduce luminescent properties into the moulded plastic. The plastic-making material may be in a state in which it is not fully polymerised. The polymerisation may occur during the moulding step. The plastic-making material may be a thermoplastic polymer material. The plastic-making material may be a thermosetting polymer material. The method may include making a plastic slide for the device.

The present invention also provides, according to a third aspect of the invention, a method of measuring an aircraft component with a hand-held measuring device according to the invention as described or claimed herein. Such a method may comprise a step of providing an aircraft component having a bore of a depth to be measured and a step of measuring the depth of the bore by means of inserting the elongate portion of the measuring device into the bore, engaging the far end of the hole with the hook of the elongate portion, and taking a reading from the first measurement scale. The taking of the reading does not need to be done whilst the device is in situ. The method may comprise a step of providing a fixing for insertion into the bore of an aircraft component, and a step of measuring the length of a fixing by means of the first formation of the device engaging with a corresponding formation on the fixing, and taking a reading from the second measurement scale. Again, taking of the reading does not need to be done whilst the device is in situ. For example, there may be a plastic slide that is arranged to slide along the length of at least a part of the device, for assisting in taking the reading. The slide may include a formation, the device including a multiplicity of indexed formations for engaging with such a formation on the slide, which may assist in taking the reading after removing the device from the component to be measured. The step of measuring the aircraft component (e.g. fixing) may include manually bringing the slide into contact with a part of the component being measured, whilst the device is in contact with the component, such that a portion of the slide then indicates on at least one of the measurement scales on the device the measured length of the component. The method may further comprise the steps of removing the device from the component, releasing manual pressure on the slide, and taking a reading of the measured length from said at least one of the measurement scales as indicated by the slide, whilst the device is not in contact with the component being measured. The slide may advantageously be held in position whilst manual pressure has been removed from the slide and whilst the device has been removed from the component being measured by means of the formation on the slide engaging with one or more of the indexed formations on the device.

The present invention also provides, according to a fourth aspect of the invention, a method of inserting a fixing and sleeve in an aircraft component utilising a hand-held measuring device according to the invention as described or claimed herein. Such a method may include a step of measuring a bore and the selecting a sleeve on the basis of the length of the bore so measured. Such a method may include a step of checking that the length of the sleeve so selected is correct by means of using the measuring device. Such a method may include a step of fitting the sleeve within the bore, for example by means of cold-expanding the sleeve within the bore (i.e. by means of expanding the sleeve in situ by a cold-working process, such a process typically resulting in an interference fit between the sleeve and the bore). Such a method may include a step of fitting a fixing within the sleeve. Such a method may include a step of using the device to measure the length of the fixing before it is inserted into the sleeve.

The sleeve is preferably of one-piece construction. The sleeve will typically have two open ends. The bore may be defined by a plurality of different elements arranged in a stack. The bore may in such circumstances be considered as passing through each element. The different elements may be each made from different material. The sleeve may have a length longer than 50 mm. The sleeve preferably has a length longer than 75 mm. The sleeve may have a length longer than 100 mm. The diameter of the sleeve may be wider than 15 mm. The diameter of the sleeve is preferably wider than 20 mm. The diameter of the sleeve may be wider than 25 mm. The fixing may be received in a bore of an aircraft pylon structure.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1a is a perspective view of a measuring device in the form of a dip gauge in accordance with a first embodiment of the invention, where a first side face of the gauge is shown;

FIG. 1b is a side-on view of the dip gauge of FIG. 1a showing a second side face of the gauge;

FIG. 1c is a view of the back of the dip gauge of FIG. 1a;

FIG. 1d is side-on view of the first side face of the dip gauge of FIG. 1a;

FIG. 1e is a view of the front of the dip gauge of FIG. 1a;

FIG. 1f is a sectional view taken along the plane A-A shown in FIG. 1b;

FIG. 2a is a side-on view of a dip gauge in accordance with a second embodiment of the invention, where a first side face of the gauge is shown;

FIG. 2b is a view of the back of the dip gauge of FIG. 2a;

FIG. 2c is a side-on view of the dip gauge of FIG. 2a showing a second side face of the gauge;

FIG. 2d is a view of the front of the dip gauge of FIG. 2a;

FIG. 2e is a perspective view of the dip gauge of FIG. 2a;

FIG. 2g is a plan view of the dip gauge of FIG. 2a;

FIG. 3a is a side-on view of the dip gauge of FIG. 2a, showing a second side face of the gauge, in a first mode of operation;

FIG. 3b is a front view of the dip gauge of FIG. 2a in the first mode of operation;

FIG. 3c is a perspective view of the dip gauge of FIG. 2a in the first mode of operation;

FIG. 3e is an enlarge view of the area labelled D in FIG. 3a;

FIG. 4c is a perspective view of the dip gauge of FIG. 2a in the second mode of operation;

FIG. 4d is an enlarged view of the area labelled G in FIG. 4a;

FIG. 5a is a side-on view of the dip gauge of FIG. 2a, showing a second side face of the gauge, in a third mode of operation;

FIG. 5b is a front view of the dip gauge of FIG. 2a in the third mode of operation;

FIG. 5c is an enlarged view of the area labelled F in FIG. 5b; and

DETAILED DESCRIPTION

All of the illustrated embodiments of the invention relate to devices for measuring the depth of a bore (commonly referred to as "dip gauges") in an aircraft component. The component may be a one-piece component or multi-part component. The bore will typically have been formed to facilitate the insertion and fitting of a fixing to the component. The fixing may serve to join two parts of the component thereby forming a joint. The devices illustrated also allow for measuring the length of such a fixing for insertion in a bore. The fixing may, depending on the type of joint to be formed, be a flat-headed fastener (e.g. a flat-head bolt) or a counter-sunk fastener (e.g. a counter-sunk bolt). The fixing may be in the form of a sleeve that when installed in the bore is in the form of a cold-expanded austenitic stainless steel sleeve fixed in the bore by means of an interference fit. The interference fit may be produced by means of a tool that inserts a non-expanded sleeve into the bore and then cold-works the metal by expanding it, thereby increasing both its internal and external diameter. An example of such a cold-worked sleeve system is provided by Fatigue Technology, Inc of 401 Andover Park East, Seattle, USA under the trade mark "Grom-Ex". Such sleeves are used to provide a bushing for receiving a bolt or other fixing means. A sleeve may be fitted in the bore by means of expanding the sleeve using a hydraulic puller unit (such as a "Big Brute Puller"—Part No. 2720-008, from FTI), which exerts a pulling force that pulls a mandrel of increasing diameter through the sleeve, thus expanding the sleeve. One application of such a sleeve system is to provide a means of attaching a pylon structure to the wing structure of an aircraft whilst also providing a means of enhancing lightning strike protection in composite, or part composite, wing structures. An example sleeve has a length of about 100 mm and a diameter of about 25 mm. The thickness of the example sleeve is about 1 mm. It is important when installing such a system for the depth of the bore to be known with accuracy and for the length of the sleeve (and of the bolt or pin that ultimately is accommodated by the sleeve) to be known and checked.

Figures 1D, 1E:
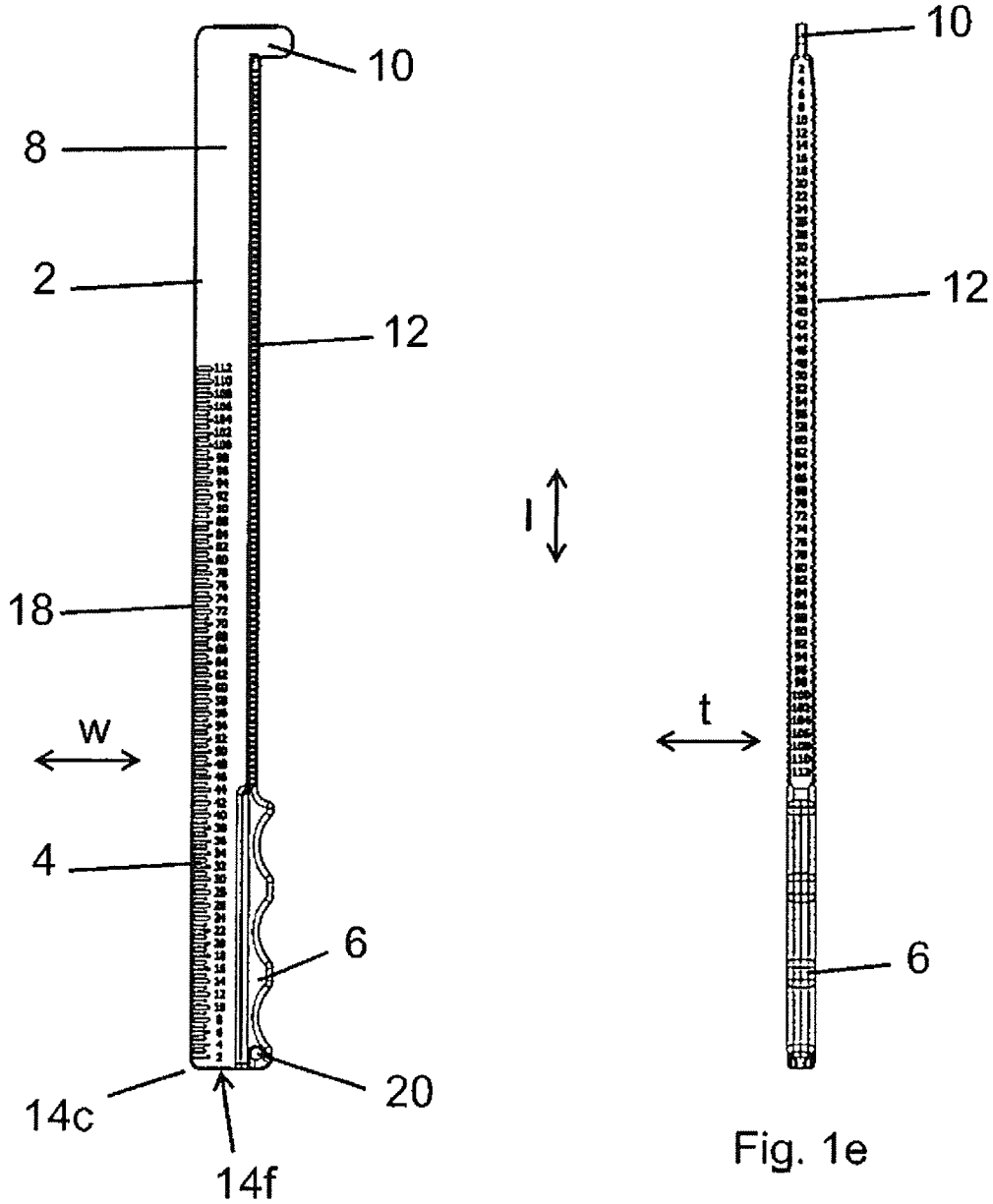

FIGS. 1a to 1f show a single-piece plastic dip gauge 2 according to a first embodiment. FIG. 1a is a perspective view where a first side face of the gauge 2 is shown, FIG. 1b is a view of a second side face of the gauge 2, FIG. 1c is a view of the back of the gauge 2, FIG. 1d is a view of the first side face of the gauge 2, FIG. 1e is a view of the front of the gauge, and FIG. 1f is a sectional view taken along the plane A-A (see FIG. 1b).

The dip gauge 2 is able to measure both the depth of a hole or bore and the length of a fixing for such a hole. The dip gauge 2 comprises a main body 4 defining a hand grip 6, which is sized to allow the whole dip gauge to be held with one hand. The dip gauge 2 has a generally elongate shape which terminates with a tang 10. The dip gauge 2 may be viewed as having a hand grip portion 6, which defines a main body 4, and from which extends an elongate shaft 8, terminating in the tang 10. The tang 10 is shaped so that it is able to engage with a far end of a hole, whilst a portion of the gauge 2 (i.e. of the elongate shaft 8) is located within the hole. The depth of the hole may then be read off a first measurement scale 12 on the front face (see FIG. 1e). The first measurement scale 12 extends across the thickness, t, of the dip gauge 2. The dip gauge 2 comprises a first formation in the form of a corner 14c and flat 14f. The flat 14f and corner 14c are arranged to allow for engagement with a flat-headed fixing. For example the corner 14c of the dip gauge 2 can fit in the junction between the shank of a bolt and the underside of the flat head when the flat portion 14f of the dip gauge 2 abuts the flat underside of the flat head. The dip gauge 2 has a second measurement scale 18 from which the length of such a flat-headed fixing can be determined. The dip gauge 2 has a third measurement scale 24 from which the length of such a flat-headed fixing can be determined from the second side face (see FIG. 1b). The dip gauge 2 is therefore ambidextrous.

The dip gauge 2 is made from luminous plastic and the dip gauge 2 glows in the dark. The dip gauge 2 includes a hole 20 to allow for attachment of a plastic ring 22 (shown only in FIG. 1a) and/or a lanyard (not shown in FIGS. 1a to 1f), which may be attached via the ring 22. The dip gauge 2 has a generally laminar shape with a substantially constant thickness of about 3 mm. However, as shown in FIG. 1f, in the region of the grip 6, the thickness is increased to about 6 mm to allow for greater comfort for the user. The portion of the gauge 2 that defines the first measurement scale 12 is in the form of a flange also of slightly greater thickness than the rest of the gauge 2, so that the scale can be readily visible and easy-to-use for the user. As can be seen in FIG. 1e the thickness of the flange on which the first measurement scale 12 is included is about the same thickness as the handle 6. With reference to FIG. 1d, the gauge 2 has a width, w, which is greatest in the region of the handle of about 20 mm and a few millimeters less higher up the shaft. The tang 10 has a width of about 25 mm and extends from right to left (as viewed in FIG. 1b) so as to be on the same side as the first measurement scale 12. The gauge 2 has a length, l, of about 260 mm.

The dip gauge 2 is of particular use for an aircraft engineer when measuring bore holes and fixings in composite aircraft components. A plastic dip gauge 2 is unlikely to cause damage to a component made from composite material. Having one tool that performs both functions reduces the chance of the tool being accidentally mislaid by an engineer, and reduces the risk of the dip gauge being left inside a fuel tank. The luminous colour of the gauge 2 means that, in the event that the gauge is accidentally lost or mislaid, it can readily be seen in poor lighting conditions, thereby reducing the risk of the gauge being left inside a fuel tank. Even if the gauge is left inside a fuel tank, the one-piece uncoated/unpainted plastic construction of the device reduces the damage that that the gauge could cause or given rise to (as compared say to a metal dip gauge).

Figures 2A, 2B:
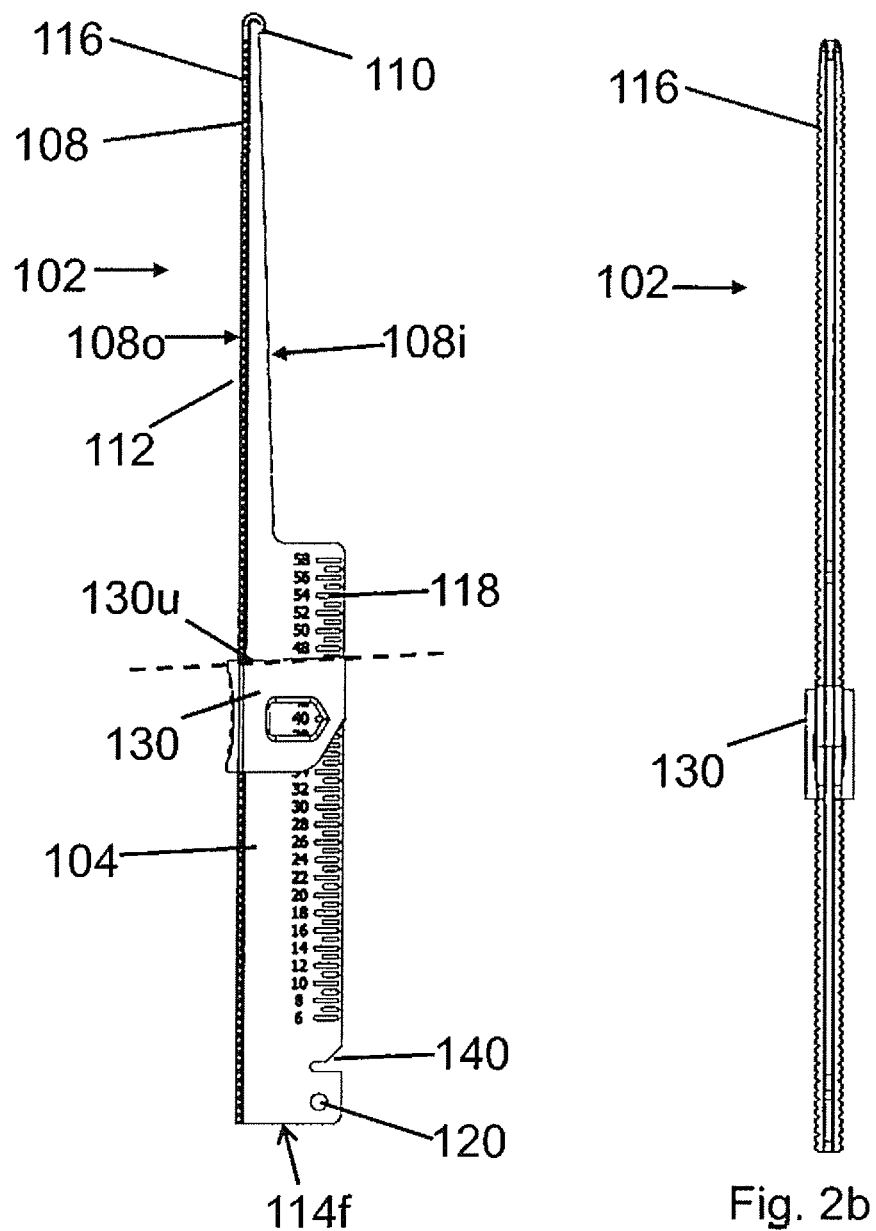
Figure 2E:
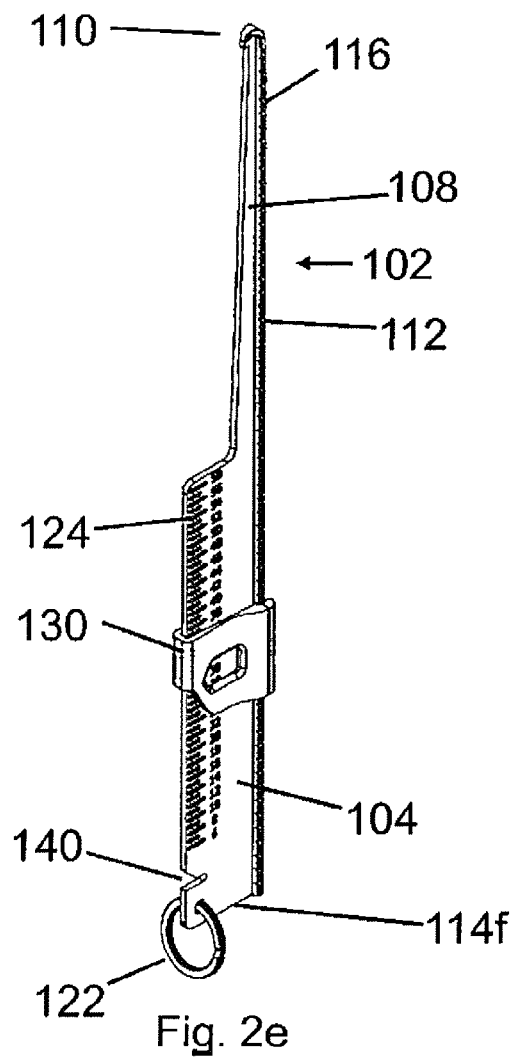
Figure 2F:
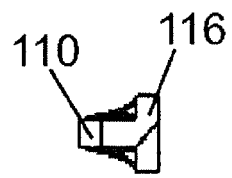
FIG. 2f is a sectional view of the dip gauge of FIG. 2c taken along the plane B-B.
Figure 2G:
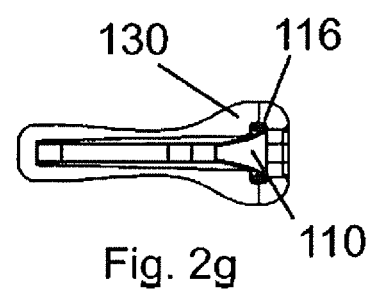
Figure 3D:
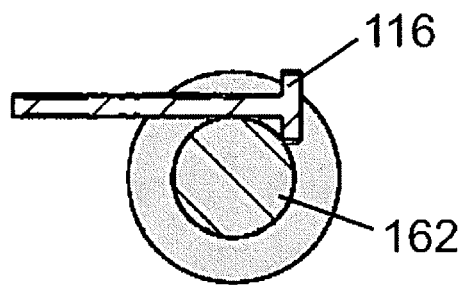
FIG. 3d is a sectional view of the dip gauge of FIG. 3a taken along the plane C-C.
Figure 3E:
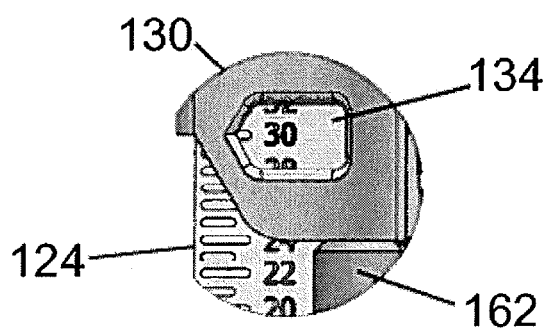
Figure 3F:
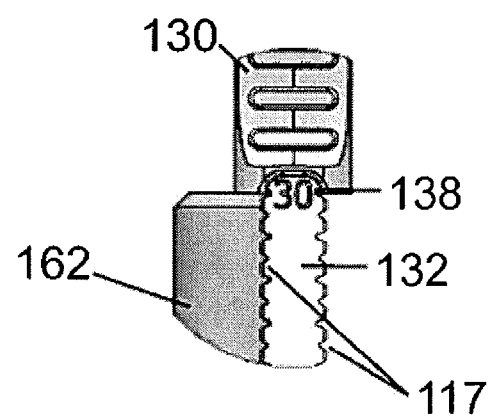
FIG. 3f is an enlarge view of the area labelled E in FIG. 3b.
Figure 4A:
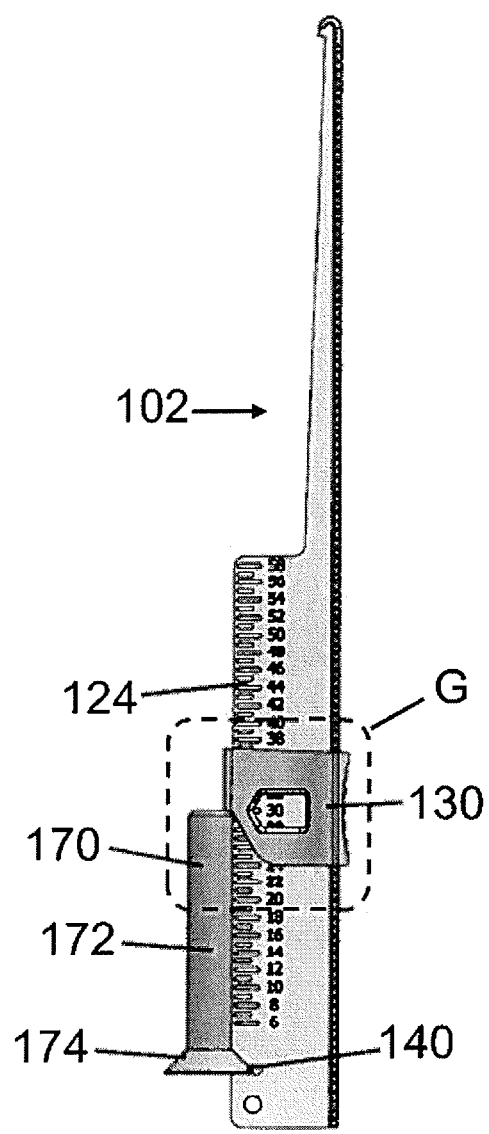
FIG. 4a is a side-on view of the dip gauge of FIG. 2a, showing a second side face of the gauge, in a second mode of operation.
Figure 4B:
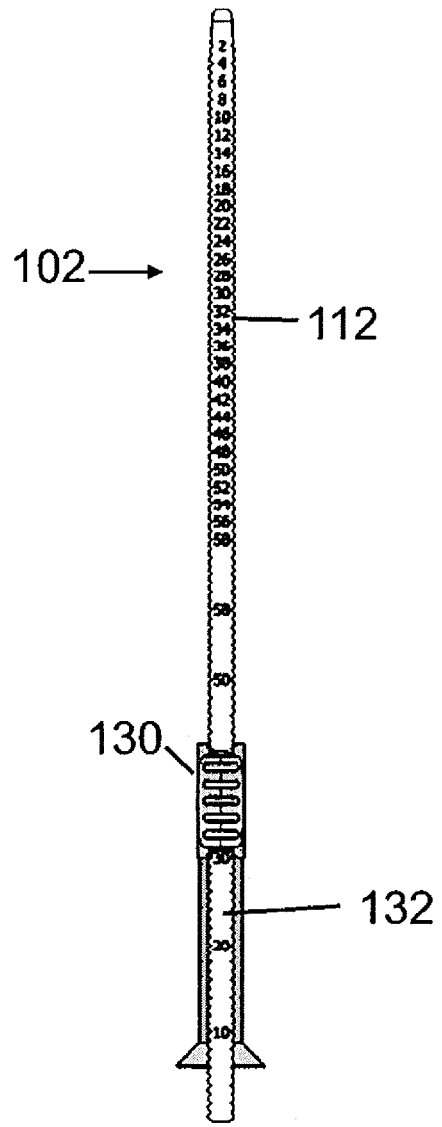
FIG. 4b is a front view of the dip gauge of FIG. 2a in the second mode of operation.

FIGS. 2a through to 5c show a dip gauge 102 according to a second embodiment of the invention. FIGS. 2a to 2g show the dip gauge 102 on its own, whereas FIGS. 3a to 5c show the dip gauge 102 in use. With reference to FIGS. 2a to 2g, the general structure of the dip gauge is similar to that of the first embodiment, in that the dip gauge 102 is of plastic construction, has a tang 110 at the end of an elongate portion 108 and has the ability to measure both a hole depth by means of a first measurement scale 112 (which in this embodiment is provided on the rear surface of the gauge) and the length of a flat-headed bolt by means of a second measurement scale 118. The main differences, as will be explained in further detail below, are that the gauge has a main body 104 of significantly greater width than the elongate portion which defines the tang 110 and which extends from the main body 104, there is a slide 130 for assisting in taking measurements, there is a recess 140 which allows the gauge to measure the length of a countersunk fixing, and there is a further measurement scale 132.

The dip gauge 102 of the second embodiment has a main body 104 of a width of about 20 mm from which an elongate portion 108 extends. The main body 104 serves as the grip or handle of the gauge, although there is no special shape provided to enhance the grip of the gauge of this embodiment. The elongate portion has a tapering width (tapering at an angle of about 2 degrees) from its base where the width is about 6 mm to the point immediately before the tang 110, where its width is about 3 mm. Thus the elongate portion 108 has an inner surface 108i that in inclined at an angle of about 2 degrees to its vertical outer surface 108o. The tang 110 in this embodiment extends inwardly towards the main body of the device (extending from left to right in FIG. 2a) so as to be on the opposite side of gauge 2 to the first measurement scale 112. The length of the gauge 102 is about 200 mm.

The dip gauge includes a first measurement scale 112 extending across the thickness, t, of the elongate portion of the dip gauge 102 for measuring bore depths. There are also second and third measurement scales 118, 124, on opposite side faces of the gauge, for measuring bolt lengths in an ambidextrous manner. There is also in this embodiment a fourth measurement scale 132 extending across the thickness, t, of the main body of the gauge 2 (i.e. the lower part of the gauge) for measuring the length of bolts.

The dip gauge 102 has a recess 140 shaped to fit and engage with a countersunk head of a bolt. The dip gauge also has the ability to measure the length of flat head bolts and thus comprises a corner 114c and flat 114f for engagement with such a flat-headed fixing. The various modes of use of the gauge will be described in further detail below.

The gauge 102 is provided with a slide indicator 130, which comprises two windows 134 one associated with each face of the gauge, through which the second and third measurement scales 118, 124 may be viewed. The slide indicator 130 also includes an upper recess 136 and a lower recess 138 positioned so as to indicate readings on the first and fourth measurement scales 112, 132. The slide has an upper surface 130u that is angled so as to be perpendicular to the inclined inner surface 108i of the elongate portion 108. It is therefore at an angle of about 88 degrees to the vertical outer surface 108o of the elongate portion 108.

The dip gauge 102 has a flange 116 that runs along the length of the gauge 102, which acts as a runner along which the slide is able to slide. The interior surfaces of the slide 130 are shaped to correspond to the flange, as best seen from FIG. 2g. The lateral edges of the flange 116 are indexed with notches 117 (see FIG. 3f) along the length of the device, the notches being spaced apart by $\frac{1}{16}$ of an inch (~1.59 mm). Each notch is associated with a measurement line, and every other measurement line is numbered with a number indicating a distance measurement (although for the sake of clarity only some of the numbers are shown on the fourth scale 132). The interior surface of the slide has two protuberances (not shown in the Figures) which interface and cooperate with the notches, such that the slide has a tendency to remain in a position corresponding to a notch. The force required to slide the slide from a stationary indexed position in which the protuberances cooperate with corresponding notches is greater than the force required to move the slide along in between such indexed positions. The dip gauge 102 including the slide is made from plastic and as such the slide and the protuberances are able to flex and deform sufficiently to allow the slide to be moved manually along the length of the gauge 102 whilst being sufficiently well held in place that it does not slide freely of its own accord, for example under gravity.

The use of the dip gauge will now be described with reference to FIGS. 3a to 5c, which show the three principal modes of operation, namely measuring the length of a flat-headed fixing, measuring the length of a countersunk-headed fixing, and measuring the depth of a bore in a component.

FIGS. 3a to 3f show the first mode of operation, in which the gauge 102 is being used to measure the length of a flat-headed bolt 160. In this mode, the flat bottom edge 114f of the dip gauge 102 engages one end of the bolt by means of abutting the underside 164 of the flat head of the bolt 160, such that the flange 116 rests against the shank 162 of the bolt 160 (see FIG. 3d). The length of the bolt may then be read from the dip gauge 102 in several different ways. First, the length of the bolt may be read directly from the fourth measurement scale 132. Alternatively, the length may be measured by moving the slide 130 down so that it abuts the free end of the shank 162 of the bolt (i.e. as shown in FIGS. 3a, 3b, 3c, 3e, and 30 and a reading taken from the measurement as indicated by the slide. The slide can indicate the measurement on the second or third scales 118, 124, by means of the window 134 (see FIG. 3e), or on the fourth scale 132 by means of the lower indentation 138 (see FIG. 3f).

FIGS. 4a to 4d show the second mode of operation, in which the gauge 102 is being used to measure the length of a countersunk-headed bolt 170. In this mode, the countersunk head 174 of the bolt 170 is engaged by the gauge by means of the head locating in the correspondingly shaped recess 140 of the dip gauge 102 with the shank 172 of the bolt 170 abutting and resting against the long edge of the gauge (the edge opposite the narrow face on which the first and fourth measurement scales are located. The length of the bolt 170 may then be read from the dip gauge 102 in several different ways. Again, the length of the bolt 170 may be read directly from either of the second or third measurement scales 118, 124. Alternatively, the length may be measured by moving the slide 130 down so that it abuts the free end of the shank 172 of the bolt (i.e. as shown in all of FIGS. 4a to 4d) and a reading taken from the measurement as indicated by the slide 130. The slide 130 in this second mode can indicate the measurement on the second or third scales 118, 124, by means of the window 134 (see FIG. 4d), or on the fourth scale 132 by means of the lower indentation 138 (see FIG. 4b). It will be noted that, in this second mode, the slide is so shaped that a different part of the slide (at a different location relative to the length of the gauge 102) abuts the free end of the bolt as compared with the first mode. This however allows the same measurement scales to be used to indicate the length of the bolt, despite the head of the bolt cooperating with the gauge in different ways, according to whether the head is flat or countersunk.

FIGS. 5a to 5c show the third mode of operation, in which the gauge 102 is being used to measure the depth of a cylindrical bore 180 in an aircraft component 182. The operator pushes the dip gauge 102 up through the bore 180 and then moves it sideways until the tang 110 lips over the edge of the bore 180. Thus, in this mode, the tang 110 engages the end of the cylindrical bore 180, simply by the engaging surface of the tang 110 resting against the surface immediately surrounding (and thereby defining) the end of the bore. With the tang so engaged, the inner surface 108i of the elongate portion 108 is held against the interior of the cylindrical bore 180. The opposite, outer, surface 108o (the surface on which the first measurement scale 112 is located) of the elongate portion 108 is thus inclined to the axis of the bore 180. The measurement scale may be scaled to correct for this inclination, but given the very slight inclination (only 2 degrees) the error in reading (less than 0.1%) is not sufficiently significant to warrant resealing of the scale. The depth of the bore 180 may then be read from the dip gauge 102 in several different ways. The depth of the bore 180 may be read directly from the first scale 112 with the gauge in situ. Alternatively, the depth of the bore may be measured by moving the slide 130 up so that it abuts the end of the bore opposite to that engaged by the tank 110 (i.e. as shown in all of FIGS. 5a to 5c) and a reading taken from the measurement as indicated by the slide 130. The slide 130 in this third mode can indicate the measurement on the first scale 112 only, by means of the upper recess 136 on the slide 130 (see FIG. 5c). It will be noted that, in this third mode, the slide is so shaped that a different part of the slide (the inclined upper surface 130u) abuts the component being measured, as compared with the first and second modes of operation. It will also be noted that different parts of the slide are used to indicate on the various measurement scales the length of the dimension being measured, as between the three principal modes of operation.

In all of the above three modes, the slide can be moved to abut the component whilst the relevant part of the gauge engages/cooperates with the other end of the component/bore being measured, the gauge removed with the slide being left in place, and only then need the user read the measurement taken. Thus, the slide may be used to take a measurement that is only read by the user after the gauge is removed from the component being measured. For example, in the third mode of operation, when the dip gauge 102 is positioned with the tang 110 resting on the bore edge, the slider may be moved up against the bottom of the bore 180, the gauge then being moved in towards the centre of the bore 180 and then withdrawn downwards. Once the gauge is clear of the bore, the operator can clearly read the measurement from the first measurement scale 112.

The dip gauge of the first and second embodiments could each be used as part of a method of inserting and fitting a sleeve in a cylindrical bore in an aircraft component. The depth of the hole can be measured, a correct sleeve selected and fitted, and then a bolt of an appropriate length selected and fitted. The dip gauge could of course be used to measure the length of the both before it is fitted in the sleeve. With the dip gauge of the second embodiment, the length of the sleeve (having a countersunk head typically) could also be checked before fitting. The sleeve may for example be fitted within the bore by means of cold-expanding process. The bore may be in a component, for example one or more parts of an aircraft or portions thereof. Such portions may for example be in the form of a stack comprising two or more separate elements made of different materials at least one being a metal material and one being a composite fibre reinforced polymer material (for example as used in an aircraft wing cover).

Figure 6:
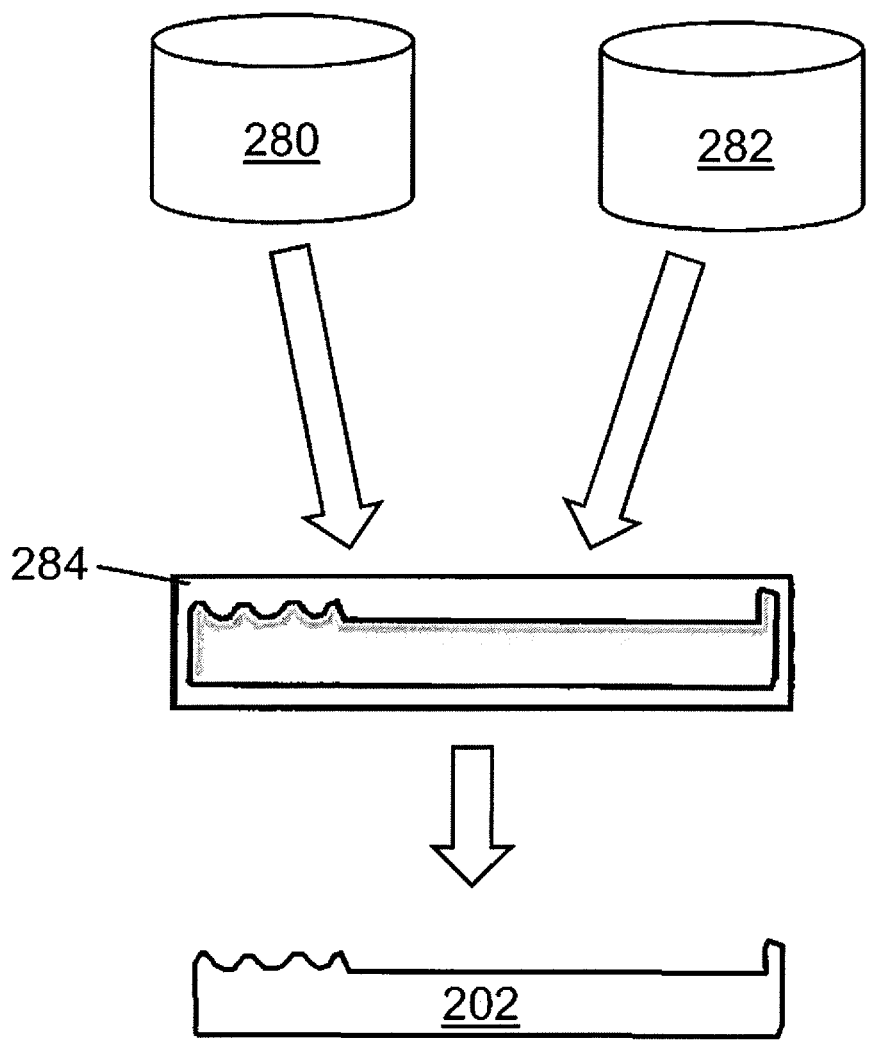
FIG. 6 is a flow diagram illustrating a method of manufacturing a measuring device of either the first or second embodiments.

FIG. 6 shows schematically a method of making a dip gauge 202 that is of the same sort of dip gauge as that of the first embodiment. Pellets 280 of a suitable thermoplastic polymer polycarbonate are mixed with pellets 282 of colour additive by melting the two sets of pellets together in a masterbatch process. The molten polymer mix is then injection moulded into a suitable mould 284 and then allowed to cure/set. The dip gauge 202 so formed is then removed from the mould 284, and cleaned and dried so as to be ready for use. The colour additive is chosen to make the dip gauge 202 brightly coloured and/or glow in the dark. Polycarbonate is well suited to being coloured in this manner. The required measurement scales (not shown in FIG. 6) on the dip gauge 202 are moulded into the dip gauge 202 by means of corresponding surface relief in the mould 284. The dip gauge 202 so moulded is thus of one-piece construction, although a ring or lanyard may be attached to the dip gauge 202 if so desired. A similar process may be used to manufacture the dip gauge of the second embodiment. The slide is made separately and then assembled with the dip gauge after both components have been moulded.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The fixings, sleeves, bolts and the like mentioned above in relation to the embodiment need not be ones used in an aerospace or aviation application.

The scale of the dip gauge may be in metric, imperial and indeed any convenient measurement system that has sufficient resolution on the dip gauge to be fit for purpose.

The first measurement scale on the dip gauge of the second embodiment, which in use is inclined to the axis of the bore being measured, may be scaled to correct for its inclination, especially if much more than the 2 degrees described. This would then mean that the straight line distance between two notches on the first measurement scale would be greater than the arithmetical difference between the distances indicated by those two notches.

The slide of the second embodiment could be removable. The slide of the second embodiment could be omitted altogether. Whether or not the slide of the second embodiment is removed or omitted, instead of using the slide to take a measurement to be read from the gauge after the gauge is removed from the component being measured, the user could instead use a finger nail on one of the notched measurement scales in a similar manner to the use of the slide. Keeping the finger nail in the relevant notch whilst removing the gauge from the component being measured may allow the reading to be taken with confidence, because the user will have confidence that his/her finger nail will not have moved along the scale between taking the measurement and reading the result.

The tang may be any suitable shape that allows the device to hook onto an end of the cylindrical bore. The tang could be replaced for example simply by a step in the elongate portion of the dip gauge, which allows the dip gauge to effectively hook on to the end of the bore. When moulding the dip gauge from polymer material, powder polymer material could be used instead of pellets. The material used to mould the dip gauge could also be precoloured pre-mixed polymer material, that needs to moulded and cured/set. The plastic making material supplied could be in a pre-polymerised state. The colouring additive could instead make the dip gauge fluoresce or glow in the dark only when stimulated by external means, for example by UV radiation.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A hand-held measuring device for measuring both the depth of a hole and the length of a fixing for such a hole, wherein the measuring device comprises
    an elongate portion terminating with a hook, the hook being arranged for engaging with a far end of a hole whilst the elongate portion is located within the hole,
    a first measurement scale from which the depth of the hole may be determined when the hook is engaged with the far end of the hole,
    a first formation arranged to engage with a corresponding formation on a fixing for such a hole, and
    a second measurement scale from which the length of a fixing may be determined when the first formation is engaged with the fixing,
    wherein the origin of the second measurement scale being displaced from the origin of the first measurement scale in a direction substantially parallel to the longitudinal axis of the device,
    the first measurement scale, second measurement scale and hook are provided on a single unitary main body,
    and wherein
    the measuring device is made from plastic.

2. A measuring device according to claim 1, wherein the measuring device is made from a high-visibility plastic.

3. A measuring device according to claim 1, wherein the measuring device is made from a luminescent plastic.

4. A measuring device according to claim 1, wherein the measuring device has a third measurement scale, such that one of the first to third measurement scales is located on one side of the measuring device, another of the first to third measurement scales is located on the opposite side of the measuring device, and another of the first to third measurement scales is located on an adjacent side of the measuring device, whereby the measuring device is ambidextrous.

5. A measuring device according to claim 4, wherein the third measurement scale is arranged to allow the length of a fixing to be determined when the first formation is engaged with the fixing.

6. A measuring device according to claim 1, wherein the measuring device has a generally laminar shape with a substantially constant thickness and the first measurement scale is provided on a surface of the measuring device that extends across the thickness of the measuring device.

7. A measuring device according to claim 1, wherein the measuring device has a second formation arranged to engage with a corresponding formation on a fixing for such a hole and a further measurement scale from which the length of a fixing may be determined when the second formation is engaged with the fixing.

8. A measuring device according to claim 7, wherein one of the first formation and the second formation comprises a surface extending perpendicularly to the associated measurement scale, the surface being arranged to abut against an underside of a head of a flat-headed fixing, whereas the other of the first formation and the second formation comprises a recess shaped to fit and engage a head of a counter-sunk fixing.

9. A measuring device according to claim 1, wherein the measuring device includes a plastic slide that is arranged to slide along the length of at least a part of the measuring device and abut a portion of the component to be measured when the measuring device is in a measuring position so that when the slide is so positioned it indicates the distance on the scale that corresponds to the length of the dimension being measured.

10. A measuring device according to claim 9, wherein the measuring device includes a series of indexed formations along the length of the measuring device with which the plastic slide is arranged to engage as it slides along the length of the measuring device, such that the force required to move the plastic slide from a position in which it is engaging one of the indexed formations is less than the force required to move the plastic slide from a stationary position midway between two such indexed formations.

11. A measuring device according to claim 9, wherein the plastic slide is so arranged to indicate on the first measurement scale the measured depth of a hole, when the hook is engaged with the far end of the hole and the slide is moved to abut the structure defining the near end of the hole.

12. A measuring device according to claim 11, wherein the slide is arranged to have at least three different measuring modes, the three modes including a first mode for indicating on the first measurement scale the measured depth of a hole, and second and third modes, one of the second and third modes being used to indicate on one of the second and third measurement scales the measured length of a countersunk fixing whereas the other of the second and third modes being used to indicate on the other of the second and third measurement scales the measured length of a flat-headed fixing.

13. A measuring device according to claim 12, wherein for one of the measurement modes, a different part of the slide is arranged to abut the component being measured as compared to at least two of the three measuring modes.

14. A measuring device according to claim 12, wherein for one of the measurement modes, a different part of the slide is arranged to indicate the distance being measured as compared to at least two of the three measuring modes.

15. A measuring device according to claim 9, wherein the plastic slide is so arranged to indicate on the second measurement scale the measured length of a fixing, when the first formation is engaged with the fixing at one end and the slide is moved to abut an opposite end of the fixing.

16. A measuring device according to claim 9, when dependent on claim 7, wherein the plastic slide is so arranged to indicate on the further measurement scale the measured length of a fixing, when the second formation is engaged with the fixing at one end and the slide is moved to abut an opposite end of the fixing.

17. A measuring device according to claim 9, wherein the measuring device is configured to be used to measure distances both with and without the assistance of the slide.

18. A measuring device according to claim 1, wherein the first measurement scale is located in a first plane, the second measurement scale is located in a second plane, and the first plane is different to the second plane.

19. A measuring device according to claim 18, wherein the first plane and second plane are substantially perpendicular.

20. A hand-held measuring device for measuring both the depth of a hole and the length of a fixing for such a hole, wherein the measuring device comprises:
   an elongate portion terminating with a hook, the hook being arranged for engaging with a far end of a hole whilst the elongate portion is located within the hole,
   a first measurement scale from which the depth of the hole may be determined when the hook is engaged with the far end of the hole,
   a first formation arranged to engage with a corresponding formation on a fixing for such a hole, and
   a second measurement scale from which the length of a fixing may be determined when the first formation is engaged with the fixing,
   wherein
   the first measurement scale is located in a first plane, the second measurement scale is located in a second plane, and the first plane is substantially perpendicular to the second plane,
   and wherein
   the measuring device is made from plastic.

21. A measuring device according to claim 20, wherein the origin of the second measurement scale is displaced from the origin of the first measurement scale in a direction substantially parallel to the longitudinal axis of the device.

22. A measuring device according to claim 20, wherein the first measurement scale, second measurement scale and hook are provided on a single unitary main body.

\* \* \* \* \*